United States Patent
Grangaard, Jr. et al.

[15] 3,678,739
[45] July 25, 1972

[54] SOIL STRAIN GAGE
[72] Inventors: Orrin H. Grangaard, Jr., Saint Paul, Minn.; Ernest T. Selig, Williamsville, N.Y.
[73] Assignee: Bison Instruments, Inc., Minneapolis, Minn.
[22] Filed: Oct. 5, 1970
[21] Appl. No.: 77,986

[52] U.S. Cl. ..............................................73/88.5 R, 73/88 E
[51] Int. Cl. ............................................................G01b 7/18
[58] Field of Search ..................73/88 E, 88.5 R; 324/34 PS, 324/34 D, 34 ST, 59; 336/115, 129

[56] References Cited

UNITED STATES PATENTS

| | | | |
|---|---|---|---|
| 3,262,309 | 7/1966 | Anderson | 73/88.5 R |
| 1,708,333 | 4/1929 | Smith | 73/88.5 R |
| 2,532,231 | 11/1950 | Jarvis | 324/34 R X |
| 2,757,923 | 8/1956 | Lefsheik | 336/115 X |
| 3,292,077 | 12/1966 | Sloughter | 324/34 R X |

Primary Examiner—Charles A. Ruehl
Attorney—Parker, Carter & Markey

[57] ABSTRACT

An instrument for measuring deformation between two spaced points within a given medium including a pair of spaced coils positioned within the medium. A source of alternating current provides a signal for one coil and there are means connected to the other coil for measuring the induced current or voltage. Such induced current or voltage is compared against a reference, first before a deforming force is applied to the medium to establish a predetermined relationship between the reference signal and the induced signal, and then after or during the period when a deforming force is applied to measure any change in the relationship between the coils which provides an indication of deformation of the medium.

4 Claims, 1 Drawing Figure

Patented July 25, 1972
3,678,739
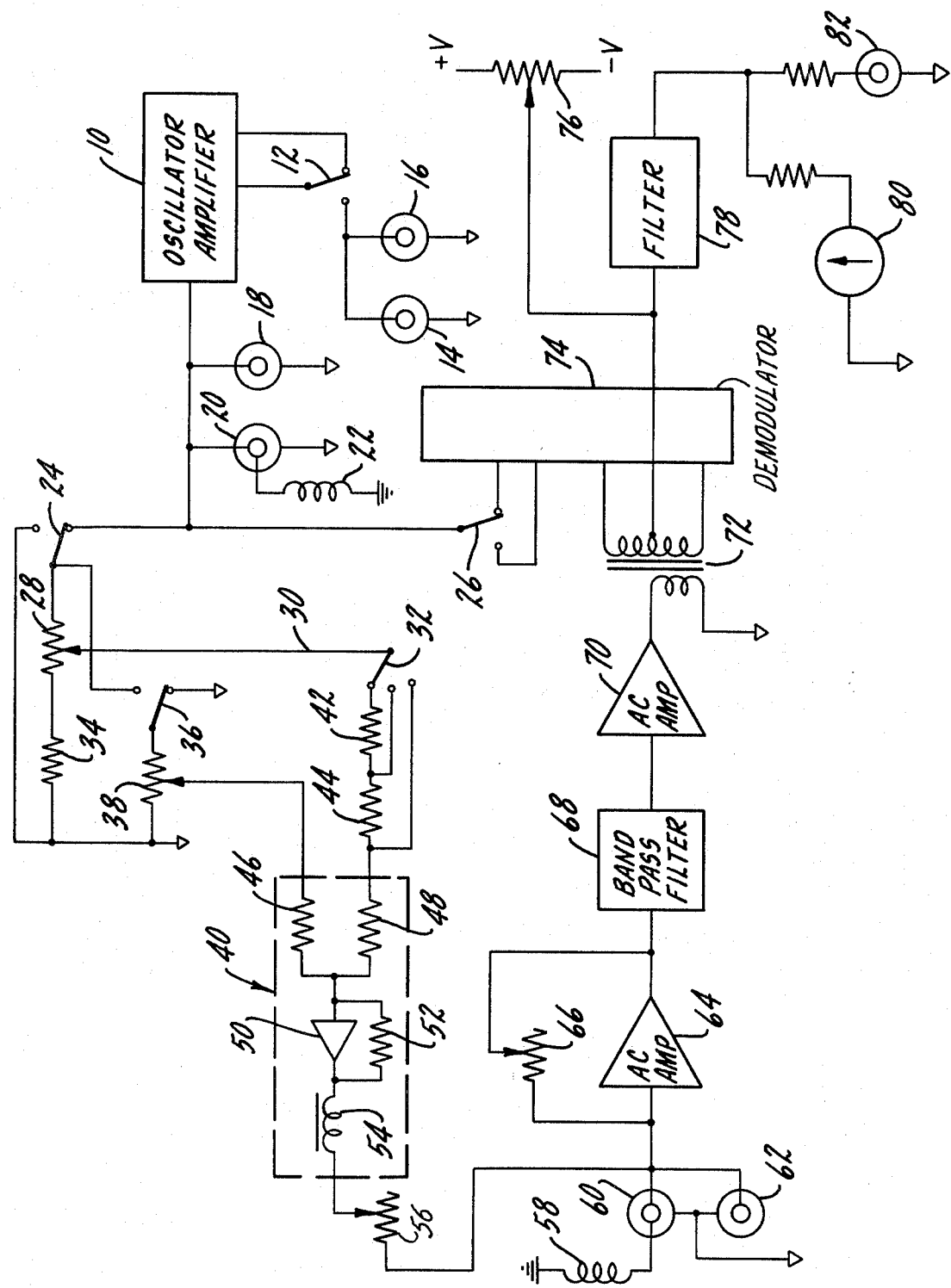
INVENTORS.
ERNEST T. SELIG
ORRIN H. GRANGAARD, JR.
BY Parker, Carter & Markey
Attorneys.

SOIL STRAIN GAGE

SUMMARY OF THE INVENTION

The present invention relates to a strain gage and has particular application to a strain gage using a pair of coils for measuring deformation of a particular substance or medium.

Another purpose is an instrument of the type described which utilizes a pair of spaced coils positioned within the medium and means for simulating a second pair of coils spaced outside of the medium and functioning as a reference.

Another purpose is an instrument of the type described which is reliable in operation, simple and compact.

Another purpose is an instrument of the type described in which a pair of coils are positioned within a medium, the deformation of which is to be measured, and means are provided for first establishing a predetermined relationship between the signal induced in one of the coils and a reference and then to measure the change in such relationship to provide an indication of the strain affecting the medium.

Another purpose is to measure the thickness of materials using the coil spacing as for example when a direct physical measure is not possible or impractical.

Other purposes will appear in the ensuing specification, drawings and claims.

BRIEF DESCRIPTION OF THE DRAWINGS

The invention is illustrated diagrammatically in the attached circuit diagram showing a preferred form of the invention.

DESCRIPTION OF THE PREFERRED EMBODIMENT

The present invention has application in the field of measuring stress and strain in various mediums, such as soil, concrete, air and fluids. A prior instrument to accomplish somewhat the same purpose is illustrated in U.S. Pat. No. 3,262,309. In the patented instrument a pair of coaxial coils of different sizes are placed in a particular medium. A second similar pair of coils, designated as the reference coils, are placed in an area external to the medium to be tested. The same driving signal is applied to one coil in each pair and the four coils are connected in a bridge circuit. The signals induced in the other coil in each pair are compared with each other and the bridge is balanced by adjusting the spacing or relationship between the reference coils. Subsequently, a deforming force is applied to the medium being tested and the unbalance of the bridge or the change in relationship of the bridge components is then measured to provide an indication of the strain within the medium being tested.

The present invention is a distinct improvement on the instrument shown in the patent in that it has eliminated the necessity for a pair of reference coils. Instead, there are means within the instrument to simulate a reference signal which is then compared with the signal induced in one of the coils within the medium.

Various coil configurations can be used with the circuit illustrated herein. The coils may be parallel and coaxial with each other to measure compression or extension, the coils may be parallel and co-planar to measure compression or extension, or the coils may be at right angles to measure shear or rotation, or the coils may be positioned in a variety of other configurations to measure different types of deformation.

In addition, the size of the coils in the pair may be the same or different.

Although the circuit disclosed herein has found application in the field of measuring strain in soil, it is equally applicable to measure strain and other types of deformation or spacings in concrete, air, water and various other fluids. Any medium which can be arranged to accommodate the coils or sensors may have its deformation measured with the present invention.

An oscillator amplifier is indicated at 10 and in one form of the invention may operate at 20kz. A switch 12 is connected to the oscillator 10 and in the position shown arranges the instrument for internal oscillator operation. A pair of jacks 14 and 16 are connected to the switch 12 and may be used when an external oscillator is to provide the driving signal. Connected to the output of the oscillator 10 are a pair of jacks 18 and 20 with a coil 22 being connected to the jack 20. The jacks 18 and 20 are output connections and the coil 22 may be one of the pair of coils used to measure deformation in a particular medium. The opposite end of the coil 22 will be connected to ground. The output from the oscillator 10 is also connected to a reference selector switch 24 and a phase switch 26.

A potentiometer 28 is connected to the arm of switch 24 and has its variable lead 30 connected to a coil separation selector 32. The coil separation selector provides for different coil separations and is in effect a range switch. Potentiometer 28 is connected to a resistor 34 and to a calibrate switch 36. A potentiometer 38, designated a calibrate potentiometer, is connected to switch 36 and to resistance 34. The movable arm of calibrate potentiometer 38 is connected to a simulator indicated generally at 40. One input for the simulator 40 comes from the calibrate potentiometer and the other input comes from the coil separation selector 32, through a pair of resistors 42 and 44. The simulator 40 may include resistors 46 and 48 connected to an amplifier 50, which is in parallel with a resistor 52. A coil 54 provides the output from the simulator and is connected to a potentiometer 56 which is designated as a phase potentiometer.

Coil 58, which is the pickup coil for the instrument and with coil 22 will be placed within the medium to be tested, is connected to an input jack 60. There is a second input jack 62 for use by a second pickup coil. Jack 60 and thus input or pickup coil 58 is connected to an amplifier 64 which is bypassed by a sensitivity potentiometer 66. The output from amplifier 64 is connected through a bandpass filter 68 to a second amplifier 70. The output from amplifier 70 may be connected through a transformer 72 to a demodulator 74.

The signal from the demodulator is connected to a potentiometer 76 which performs a zeroing function and to a filter 78. The output from the filter may go either to a meter 80 or to a jack 82 which provides access to a recorder. The coils 22 and 58, may be formed in a variety of sizes and shapes. As a specific example, the coils may come in three sizes, such as a 1-inch diameter coil one-eighth-inch thick, a 23/16-inch diameter coil three-sixteenths-inch thick, and a 4 ⅛-inch diameter coil three-eighths-inch thick. Both coils may be the same in size and shape or they may differ. Preferably, the coils are machined linen phenolic base forms with molded epoxy coverings for environmental stability. The coils may have different separations and looking particularly at range switch 32 or the coil separation selector, the three positions of this switch may accommodate coils spaced from 1 to 2 diameters, coils spaced from 1½ to 3 diameters, or coils spaced 2½ to 4½ diameters. The coils may be located as much as 1,000 feet from the instrument.

In operation, the zero adjust 76 will first be used to make sure that the meter 80 is in zero position. The coils 22 and 58 will then be placed a suitable distance apart in a particular medium, for example soil. The coil separation selector will be placed in an appropriate range position consistent with the relationship between the coils and assuming that the oscillator 10 is to provide the driving signal, switch 12 will be in the position shown. After the coils 22 and 58 have been appropriately positioned, the amplitude control 28 is adjusted so that the meter is at a null point or zero. If this cannot be done with the particular range set on the selector switch, this switch must be changed to a different range. In some applications it will be necessary to operate the phase switch 26 and adjust the phase control 56 to balance the bridge or in effect provide a null point at the meter 80. The operation of the amplitude control and the phase control and also the sensitivity control 66 should be continued until the meter has been appropriately balanced or placed at a null point. In essence, the signals from simulator 40 and coil 58 are balanced.

Before continuing operation and actually measuring deformation, it may also be desirable to calibrate the signal supplied by use of the calibrate potentiometer 38 and the calibrate switch 36.

At such time as the coils are appropriately placed in a particular medium, the meter has been nulled or the relationship between the coils has been established by the meter, then a suitable deforming force can be applied to the medium. If the coils are positioned in soil, a compression or shearing force may be applied, depending upon the relative positions of the coils and the type of deformation that is to be measured. The induced signal from coil 58 will again be compared with the signal from the simulator 40 and if there has been a change in the relationship between coils 22 and 58, this change will be shown on the meter. The meter can be calibrated directly in strain so that the operator has a quick indication of the strain induced as a result of the applied deformation. In the alternative, a recorder may be used. As another alternative the mater may be renulled and the new reading on the amplitude dial compared to the original reading.

As indicated above, the simulator 40 replaces a pair of coils used in prior instruments. The simulator 40 in effect provides a signal, which is used as a reference and which is compared with the induced signal from coil 58 to first establish the relationship between coils 22 and 58 and later to measure any change in this relationship brought about by deformation of the medium.

As indicated above, the coils may be placed in a variety of configurations. They may be coaxial and parallel, they may be parallel and coplanar, or they may be placed in any other relationship which is designed to measure a particular type of deformation.

Whereas the preferred form of the invention has been shown and described herein, it should be realized that there may be many modifications, substitutions and alterations thereto.

We claim:

1. Means for measuring the spacing and deformation between two spaced points within a given medium, including a pair of spaced coils positioned within the medium, a source of alternating current connected to one coil, means providing a reference signal, including a simulator connected to said source of alternating current, means connected to said other coil for comparing the signal induced therein with said reference signal, said simulator being connected to said comparison means, electrical circuit means for varying said reference signal to establish a predetermined relationship between said reference and the induced signal, a change in the position between said coils changing the induced signal and thus the relationship between the induced signal and reference signal.

2. The circuit of claim 1 further characterized in that the means for varying said reference signal include at least one variable resistance.

3. The circuit of claim 1 further characterized in that said means for providing a reference signal includes an amplifier and an output coil.

4. The circuit of claim 1 further characterized by and including means for calibrating said reference signal.

* * * * *